US006920327B1

(12) United States Patent
Brandes et al.

(10) Patent No.: US 6,920,327 B1
(45) Date of Patent: Jul. 19, 2005

(54) METHOD FOR TRANSMITTING DATA BETWEEN MASTER/SLAVE STATIONS BY MEANS OF RADIO TRANSMISSION SYSTEM AND COMPUTER FOR THE ALLOCATION OF RADIO TRANSMISSION SYSTEMS FOR THE TRANSMISSION DATA BETWEEN MASTER/SLAVE STATIONS

(75) Inventors: Axel Brandes, Lahstedt (DE); Andreas Kynast, Hidesheim (DE); Michael Ruf, Malsch-Volkersbach (DE); Werner Pöchmüller, Hildesheim (DE); Rodolfo Mann Pelz, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 10/110,254

(22) PCT Filed: Nov. 1, 2000

(86) PCT No.: PCT/DE00/03834

§ 371 (c)(1),
(2), (4) Date: Aug. 7, 2002

(87) PCT Pub. No.: WO01/41488

PCT Pub. Date: Jun. 7, 2001

(30) Foreign Application Priority Data

Nov. 30, 1999 (DE) .......................................... 199 57 642

(51) Int. Cl.[7] ................................................ H04Q 7/20
(52) U.S. Cl. ...................... 455/452.1; 370/329; 370/465
(58) Field of Search ............................... 455/452.1, 450, 455/451, 452.2, 553.1; 370/328, 329, 338, 349, 465

(56) References Cited

U.S. PATENT DOCUMENTS 5,303,393 A   4/1994   Noreen et al.
H1641 H       4/1997   Sharman 5,802,502 A   9/1998   Manning et al.

(Continued)

FOREIGN PATENT DOCUMENTS

| EP | 0 766 490 | 5/1991 |
| GB | 2 313 981 | 12/1997 |
| WO | WO 95/31060 | 11/1995 |
| WO | WO 96/21983 | 7/1996 |
| WO | WO 96/21984 | 7/1996 |
| WO | WO 97/02670 | 1/1997 |
| WO | WO 97/12452 | 4/1997 |
| WO | WO 97/28661 | 8/1997 |

OTHER PUBLICATIONS

T. Lauterbach et al. "Mobile Interaktive Multimedia–Dienste AUF Grundlage Des DAB/GSM–Systems" NTG Fachberichte, VDE Verlag, Berlin DE, Nr 144, 1997, Seiten 161–166, XP 000973231, ISSN: 0341–0196.

Thomas Lauterbach and Matthais Ubehaun, Multimedia Environement for Mobiles (Memo): Interactive Multimedia Services to Portable and Mobile Terminals, Proceedings ACTS Mobile Summit 97, Aalborg. pp. 581–586, Oct. 1997.

*Primary Examiner*—Marsha D. Banks-Harold
*Assistant Examiner*—Nghi H. Ly
(74) *Attorney, Agent, or Firm*—Kenyon & Kenyon

(57) ABSTRACT

A method for the transmission of data using radio transmission systems between transmitter/receiver stations is provided, and a computer for the allocation of radio transmission systems for the transmission of data between transmitter/receiver stations is provided, which serve to select radio transmission systems dynamically, for a communication from at least one transmitter/receiver station, on the basis of a subscriber profile, a location of the one transmitter/receiver station, and/or a speed of the transmitter/receiver station, in order to transmit data between transmitter/receiver stations. A computer in a switching device calculates which radio transmission system best meets the criteria. During a data transmission, it is possible to switch automatically to a further radio transmission system if the transmission quality of the radio transmission system currently being used declines.

10 Claims, 1 Drawing Sheet

U.S. PATENT DOCUMENTS 5,854,985 A * 12/1998 Sainton et al. ............ 455/553.1
5,983,113 A * 11/1999 Asanuma .................... 455/506
6,144,641 A * 11/2000 Kaplan et al. .............. 370/238
6,400,946 B1 * 6/2002 Vazvan et al. ........... 455/432.1
6,639,898 B1 * 10/2003 Dutta et al. ................. 370/238

* cited by examiner

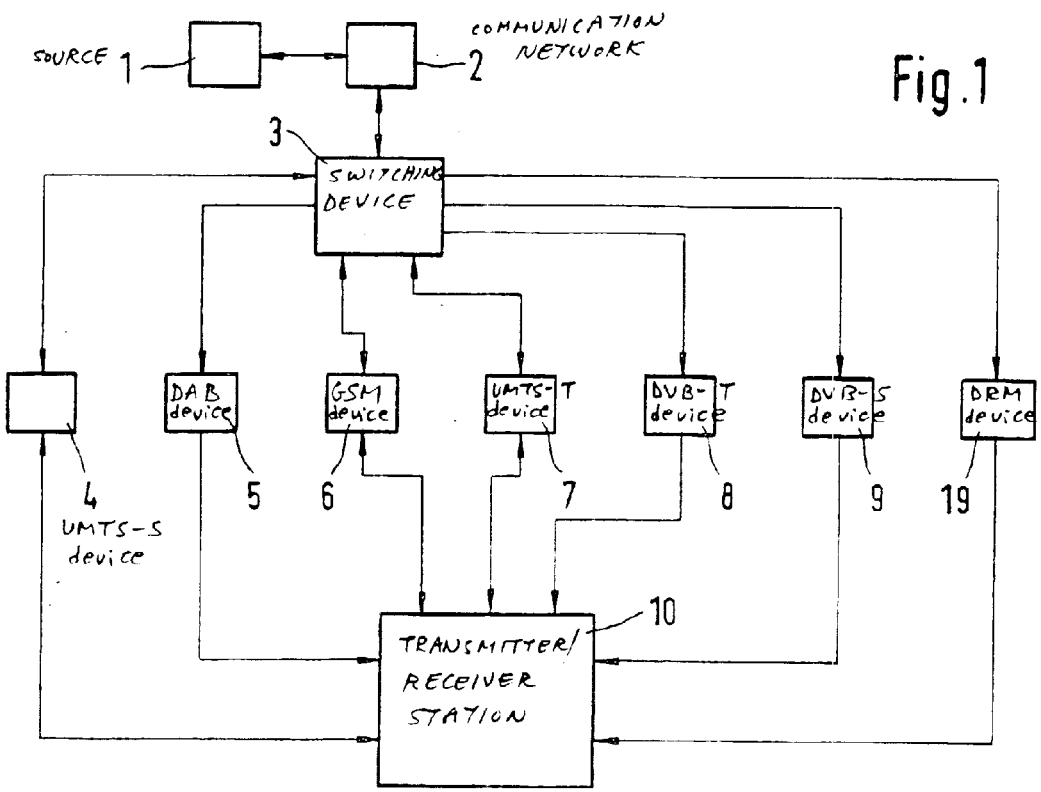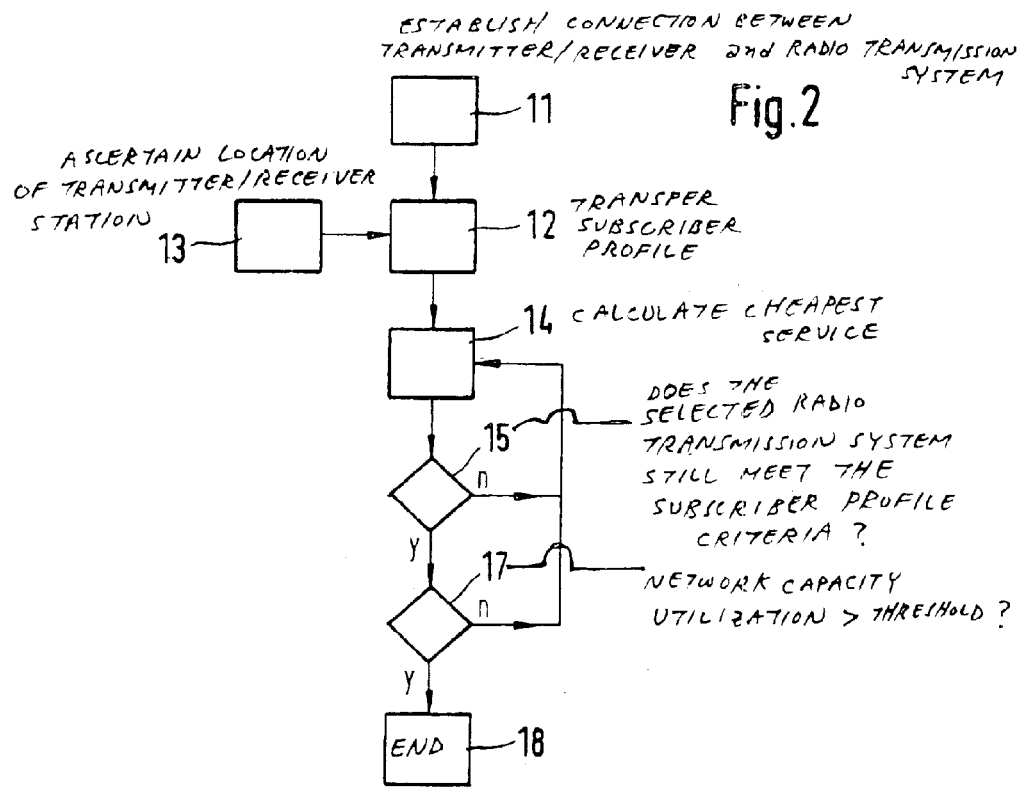

METHOD FOR TRANSMITTING DATA BETWEEN MASTER/SLAVE STATIONS BY MEANS OF RADIO TRANSMISSION SYSTEM AND COMPUTER FOR THE ALLOCATION OF RADIO TRANSMISSION SYSTEMS FOR THE TRANSMISSION DATA BETWEEN MASTER/SLAVE STATIONS

FIELD OF THE INVENTION

The invention relates to a method for the transmission of data using radio transmission systems between transmitter/receiver stations, and a computer for the allocation of radio transmission systems for a transmission of data between transmitter/receiver stations.

BACKGROUND INFORMATION

It is conventional, as known from Thomas Lauterbach and Matthias Unbehaun, Multimedia Environments for Mobiles (Memo): Interactive Multimedia Services for Portable and Mobile Terminals, Proceedings ACTS Mobile Summit 97, Aalborg, pp. 581 through 586, October 1997, to implement a combination of GSM (Global System for Mobile Communications) with DAB (Digital Audio Broadcasting). The aim is to use the low-rate GSM for a request channel, while the higher-rate DAB is utilized to make the requested data available. The intent is thereby to make possible so-called client-server applications in a motor vehicle. Both radio transmission systems (GSM and DAB) must be present, and a fixed allocation exists for the channels.

U.S. Pat. No. 5,854,985 describes a circuit that is arranged, for example, in a mobile telephone or another terminal, that performs an optimization of the radio connections for the user on the basis of defined criteria.

SUMMARY

The method according to the present invention for the transmission of data and the computer according to the present invention for the allocation of radio transmission systems may provide the advantage that a flexible allocation of radio transmission systems may be performed for a user on the basis of various criteria. Consideration may also be given in this context to the radio transmission systems that may be available for the user at his or her location, and to the speed at which a transmitter/receiver station may be moving.

The operator of the various radio transmission systems may therefore be offered a larger clientele that is distributed in accordance with the utilization of the individual radio transmission systems. If one radio transmission system is under a very heavy load, it may also be possible to hand over to an alternative radio transmission system, if the alternative radio transmission system is present.

For the user of radio transmission systems, the costs, transmission quality, and availability of a radio transmission system may be optimized. It now may also be possible for the user to use so-called end-to-end connections based on Internet protocols, utilizing a variety of radio transmission systems.

It may be advantageous that the subscriber profile of the mobile transmitter/receiver station is transmitted to the computer, so that the subscriber profile is always current.

It may be advantageous in this context that the data concerning the subscriber profile and the transmission quality may be transmitted to the computer via an uplink from the mobile transmitter/receiver station, so that a signaling operation may be utilized to use these data for radio transmission system selection.

It may be advantageous that the subscriber profile indicates the location of the mobile transmitter/receiver station and its speed. Data that may be important for radio transmission system selection are thereby received into the subscriber profile.

It may be advantageous that the transmission quality may be measured using a signal field strength and/or an error rate. These parameters are may be measured and may allow a determination to be made as to the transmission quality of a radio transmission system.

It may be advantageous that the location of a transmitter/receiver station may be ascertained using a localization device, so that a capacity utilization of the radio transmission system for that location may be determined and an existing connection may be rerouted, if applicable, to a different radio transmission system in order to relieve the load on an overloaded radio transmission system.

It may be advantageous that a subscriber profile indicates the price a customer is prepared for a transmission of data, the quality he or she requests for the transmission, and the transmission rate he or she requires. It may thereby be possible, in simple fashion, to use an appropriate radio transmission system in accordance with the customer's wishes.

It may be advantageous that the speed of a transmitter/receiver device may be determined by vehicle sensors or using the radio signals themselves. Speed determination may be important for the selection of radio transmission systems, since different radio transmission systems may be suitable for different speeds.

It may be advantageous that during an existing transmission of data using a first radio transmission system, a change in parameters causes that transmission to be rerouted onto a second radio transmission system, so that the customer experiences no loss during the transmission of data.

It may be advantageous that the computer according to the present invention may be part of a switching device, and thus may be integrated into such systems. This makes possible economical and simple incorporation of these additional functions for the allocation of different radio transmission systems.

In an example embodiment of the invention, provision may be made that the computer is part of the mobile transmitter/receiver station itself. This may be appealing to a user of the mobile transmitter/receiver station, since the computer may then be available to him or her and may not be operated by a third party.

Example embodiments of the invention are depicted in the drawings and explained in more detail in the description which follows.

BRIEF DESCRIPTION OF THE DRAWINGS

FIG. 1 illustrates a diagram of available radio transmission systems for a transmitter/receiver station.

FIG. 2 illustrates the method according to the present invention for the transmission of data.

DETAILED DESCRIPTION

A variety of terrestrial and satellite-based radio transmission systems already exist alongside one another, and further such radio transmission systems will be added to them in the future. Radio-based localization systems, such as GPS (Global Positioning System) also exist.

These individual radio transmission systems constitute a heterogeneous radio network, the individual radio transmission systems each exhibiting advantageous characteristics for a specific user. Such advantageous characteristics include an appropriate bandwidth, costs attractive to the customer, a defined error rate, and a specific transfer mode. Suitable transfer modes may be, for example, a transmission at a variable transmission rate or a transfer mode with a fixed transmission rate.

In addition, it may also be possible for different transfer modes to have different priorities. Voice data will have a high priority, while other data, such as text data, have a low priority. This results from the fact that voice data, as well as video data, may be very sensitive to time delays in terms of their reproduction quality. A telephone conversation or video sequence would be perceived as being of poor quality if individual data were reproduced with delays of different lengths, the delays being attributable solely to delays during transmission. Such data must therefore be labeled with a high priority so that they may be transmitted before other data, such as text data. In the case of text data, one simply waits until the entire document has been transmitted. Such situations may be familiar from the World Wide Web (WWW), in which context users also wait until the pages selected by them have been completely transmitted.

Given this heterogeneous radio network structure, it may be a goal to offer both customers and radio network operators an optimum benefit by combining the advantages of the individual radio transmission systems.

There are two different types of radio network:

1. Mobile radio networks with duplex operation. These include GSM, UMTS (Universal Mobile Telecommunication System), and other satellite-based mobile radio networks such as Iridium. In these mobile radio networks, there is an incoming channel and a return channel. In the case of UMTS there is a terrestrial and a satellite-based version. Terrestrial versions of mobile radio networks have a small cell size, while satellite-based systems cover a larger area. Mobile radio transmission systems may provide the advantage that communication between two stations may be possible. GSM may have a comparatively low transmission rate at present, but expansions to this standard that are currently planned may result in considerably higher transmission rates. Mobile radio networks have a downlink and an uplink. "Downlink" refers to radio transmission from a base station to a mobile transmitter/receiver station, and "uplink" refers to radio transmission from the mobile transmitter/receiver station to the base station.

2. Broadcast distribution systems. These include DAB, DVB (Digital Video Broadcasting), and DRM (Digital Radio Mondial). These are digital broadcast distribution systems that in addition to digital audio data also have the capability of transmitting multimedia data at high transmission rates. DAB, DVB, and DRM may be suitable in this context for mobile reception, since the signals being transmitted are distributed over many frequencies, so that any frequency-selective damping that occurs when broadcast transmissions take place in the atmosphere may only have a minor effect on the signals being transmitted. It may also be possible to compensate for persistent frequency-selective damping effects using errorcorrection codes.

In addition, DAB and DVB have a large bandwidth compared to the mobile radio transmission systems. Since the signals of the broadcast distribution systems may be received by every suitable receiver in a broadcast service area, it may be possible in the context of individual apportionment of data for specific transmitter/receiver stations, using scrambling or coding, to make transmitted data accessible only to specific users. Broadcast distribution systems have only a downlink.

The radio networks, mobile radio networks, and broadcast distribution systems may be connected to additional communication networks, such as the Internet. The user thus may have available, via a connection using a radio transmission system, a connection to the Internet so as thereby to utilize the capabilities of that communication network.

According to the present invention, a computer may receive from a transmitter/receiver station, in a switching device that controls access to a communication network and receives and sends data via radio transmission systems, data that the computer then evaluates in order to allocate to the transmitter/receiver station appropriate radio transmission systems for a communication. When the transmitter/receiver station requests a connection, a mobile radio transmission system (i.e. GSM or UMTS) may be used.

FIG. 1 illustrates a diagram of available radio transmission systems for a location for a transmitter/receiver station 10, one transmitter/receiver station being illustrated here merely by way of example; further transmitter/receiver stations may be possible, in which context a communication between the transmitter/receiver stations may also be possible.

A data source 1, which may be an information server, may be connected via an input/output (i.e. via a modem) to a communication network 2 (the Internet) in order to exchange data via communication network 2. Communication network 2 may be connected via a second data input/output to a switching device 3.

Switching device 3 includes a computer according to the present invention in order to allocate for transmitter/receiver station 10 one or more appropriate radio transmission systems for a communication. Switching device 3 may be connected to the UMTS-S network via a first data input/output including a device 4. The UMTS-S network may be a satellite-based UMTS system in which satellites operate as base stations.

The connection between switching device 3 and UMTS-S device 4 will be wire-based, and the counterpart location to switching device 3 will also include a switching device for the UMTS-S network. This kind of configuration also applies to the connections of switching device 3 to the other radio transmission systems. Alternatively, it may also be possible to embody the connection from switching device 3 to the radio transmission systems as a radio connection, for example a radio relay connection.

Switching device 3 may be connected via a first data output to a DAB device 5. Switching device 3 may be connected via a second data input/output to a GSM device 6. Switching device 3 may be connected via a third data input/output to a UMTS-T device 7. Switching device 3 may be connected via a second data output to a DVB-T (terrestrial) device 8, and switching device 3 may be connected via a third data output to a DVB-S (satellite) device 9. Lastly, switching device 3 may be connected via a fourth data output to a DRM device 19.

Switching device 3 sends and receives data to and from UMTS-S device 4, GSM device 6, and UMTS-T device 7. Switching device 3 only transmits data to DAB device 5, DVB-T device 8, DVB-S device 9, and DRM device 19. What happens here may be either that data received via Internet 2 are transmitted, or data that were received using radio transmission systems UMTS-S 4, GSM 6, or UMTS-S 7 are sent.

UMTS-S device 4 may be connected via a radio channel to transmitter/receiver station 10, in which context transmission and reception may be performed by UMTS-S device 4 and transmitter/receiver station 10. DAB device 5 may be connected via a radio channel to transmitter/receiver station 10, in which context DAB device 5 transmits and transmitter/receiver device 10 only receives. GSM device 6 may be connected via a radio channel to transmitter/receiver station 10, in which context transmission and reception occur in both directions. The same applies to the radio connection between UMTS-T device 7 and transmitter/receiver station 10. Transmitter/receiver station 10 may additionally be connected via radio channels to DVB-T device 8, DVB-S device 9, and DRM device 19, in which context transmitter/receiver station 10 only receives data from DVB-T device 8, DVB-S device 9, and DRM device 19.

When transmitter/receiver station 10 wishes to make a transmission via a radio transmission system, it will first begin via a radio channel (an uplink) with a mobile radio transmission system in order to perform a signaling operation and establish a connection, since only with the mobile radio transmission system may it be possible to transmit data from transmitter/receiver station 10 to switching device 3. UMTS-S, GSM, and UMTS-T may be suitable as the mobile radio transmission system.

Upon signaling, a subscriber profile that includes data about a service quality requested by the subscriber may be transmitted by transmitter/receiver station 10. These data include the transmission rate, a permissible error rate, maximum cost that the subscriber wishes to incur for a transmission, and whether he or she wishes, for example, to transmit voice data or other data, e.g., a quantity of data for transmission. The type of data influences which specific features of a radio transmission system may be advantageous for a transmission. These include the transfer mode, permissible delay in the transmitted signals, and a packet size.

Transmitter/receiver station 10 also transmits its location over the radio channel using the subscriber profile. Transmitter/receiver station 10 ascertains its location 10 using a built-in localization device, for example a GPS system; or the location of transmitter/receiver station 10 may be indicated using the respective mobile radio transmission system, since transmitter/receiver station 10 has logged into a radio cell of the mobile radio transmission system. This may be important in terms of selection of the radio transmission systems, since the local network capacity utilization of the networks available at that location may then be incorporated into the selection.

As a further datum, transmitter/receiver station 10 transmits its instantaneous speed using the subscriber profile, since the speed determines which radio transmission method may be suitable for permitting a robust data transmission. The speed may be determined using sensors (in a motor vehicle, a speedometer) or from the radio signals themselves. This may be suitable for transmitter/receiver stations that are operated in vehicles.

For example, DVB may be preferred at low speeds or even at a standstill, while DAB, GSM, and UMTS may be suitable for high speeds. DVB and DAB offer a higher transmission rate, however.

Transmitter/receiver station 10 additionally transmits to switching device 3, via the radio network, an existing terminal profile, i.e. information as to the radio transmission systems with which transmitter/receiver station 10 may be capable of receiving and/or sending.

The radio transmission system device that has received these data from transmitter/receiver station 10 may forward them to switching device 3, so that the computer present may therein allocate the corresponding radio transmission systems to that transmitter/receiver station 10. The computer will select the radio transmission system having the highest transmission rate for the transmission of data, if the availability of the radio transmission system, expected costs for transmission of the data, and the speed of the transmitter/receiver station allow.

Linked to the subscriber profile may be a designation identifier of the transmitter/receiver station 10 that permits identification of the respective radio transmission systems. This identifier may be a number which may be accepted by the mobile radio transmission systems (such as GSM or UMTS) as the identification of a mobile station.

If the transmission quality for a radio transmission system used by transmitter/receiver station 10 declines sharply, a handover to an alternative radio transmission system may automatically be performed, if possible. A respective device of a radio transmission system reports this to switching station 3, so that the computer uses the next alternative for transmitter/receiver station 10 and thus authorizes the handover.

FIG. 2 depicts the method according to the present invention for transmitting data. The subscriber profile contains the data described above.

In method step 11, transmitter/receiver station 10 wishes to perform a communication via a radio transmission system, so that a connection may be established between transmitter/receiver station 10 and a device of a radio transmission system.

In method step 12, transmitter/receiver station 10 transfers its subscriber profile to a radio transmission system device, the location determination also being sent as a datum of the subscriber profile. In method step 13, the location of the transmitter/receiver station may be ascertained using a localization device. In method step 14, the computer in switching device 3 calculates on the basis of the subscriber profile which service of a radio transmission system is the cheapest, and selects that service if the availability and speed of the transmitter/receiver station permit it. Communication may also be performed using this radio transmission system.

In method step 15, transmitter/receiver station 10 and the respective radio transmission system device may check the current error rate of the radio transmission system being used, and transmitter/receiver station 10 may additionally check the current speed as a further element of the subscriber profile. This may be transferred to switching device 3 so that on the basis of this current information, the computer checks whether the selected radio transmission system is still meeting the criteria of the subscriber profile. If that is no longer the case, a new radio transmission system may be selected in method step 14.

If, however, the error rate and speed are still such that the radio transmission system currently being used meets the criteria, then in method step 17 the network capacity utilization may be checked by the respective radio transmission system device. If the network capacity utilization is so high that quality impairments must be accepted during data transmission (e.g. a very long time delay), this may then be transferred to switching device 3 so that in method step 14, a new radio transmission system that also meets the criteria of the subscriber profile is defined. If this happens during a data transmission, the data flow that is being exchanged between transmitter/receiver station 10 and the respective radio transmission system device is then handed over to the new radio transmission system device, so that no data loss occurs. The method ends in method step 18.

FIG. 1 depicts the manner in which data pass from a data source through the network and via a transfer using a radio transmission system to a transmitter/receiver station 10 that is located in a vehicle. Communication among several transmitter/receiver stations that are mobile may be alternatively possible. The data flow then goes from one transmitter/receiver station via a radio transmission system to switching device 3, and then to a further (or the same) radio transmission system to the other transmitter/receiver station.

Transmission quality may be ascertained on the basis of either the signal field strength or an error rate for received data. The signal field strength may be ascertained using a power level measurement or an amplitude measurement, while the error rate may be calculated with error detection methods. These error detection methods include either error-correcting and/or error-detecting codes, such as block codes or convolution codes; or checksums, known as cyclic redundancy codes, may be used.

If a radio transmission system itself offers a variety of degrees of freedom, such as different frequency bands or polarization planes, it may then be additionally possible for the computer in switching device 3 also to use these parameters for optimization of a radio connection.

The radio transmission systems presented constitute only an example; there may be more or fewer depending on availability.

Alternatively, the computer may also be part of the mobile transmitter/receiver station 10, so that the transmitter/receiver station itself makes the optimum selection for the radio transmission system to be used. In this context, the transmitter/receiver station performs signaling operations and reception measurements in order to identify the radio transmission systems available at a location. The computer may then, on the basis of the subscriber profile, select the at least one radio transmission system to be used.

The subscriber profile may also contain further data, as set forth above.

What is claimed is:

1. A method for transmission of data using radio transmission systems between transmitter/receiver stations, comprising:

receiving transmissions from at least two radio transmission systems simultaneously at one location, wherein a radio transmission system including at least one downlink and at least one uplink is operated;

operating at least one transmitter/receiver station in mobile fashion;

establishing a connection between the transmitter/receiver stations by the radio transmission system including at least one downlink and at least one uplink;

ascertaining a quantity of data for transmission by a computer after establishment of the connection between the transmitter/receiver stations, wherein the computer is operated in one transmitter/receiver station; and switching over, by the computer, in the context of a subscriber profile, one of entirely and partially to another radio transmission system having a high transfer rate if at least one of expected cost and speed of the mobile transmitter/receiver station permits.

2. The method according to claim 1, further comprising:

transmitting data concerning a transmission quality and the subscriber profile to the computer from the mobile transmitter/receiver station.

3. The method according to claim 2, wherein the data concerning the transmission quality and the subscriber profile are transmitted via the uplink.

4. The method according to claim 3, further comprising:

transmitting, on the basis of the subscriber profile, at least one of data concerning a location of the mobile transmitter/receiver station and data concerning a speed of the mobile transmitter/receiver station.

5. The method according to claim 4, further comprising:

ascertaining the transmission quality on the basis of at least one of a signal field strength and an error rate of received data.

6. The method according to claim 4, further comprising:

ascertaining the location of the mobile transmitter/receiver station by using a localization device.

7. The method according to claim 6, wherein the subscriber profile indicates a service quality that is to be made available, devices that are included in the respective transmitter/receiver station, and the maximum cost that is permissible for the transmission of data.

8. The method according to claim 7, wherein the speed of the mobile transmitter/receiver station is ascertained by using one of at least one sensor and radio signals.

9. The method according to claim 8, further comprising the step of:

transferring the data to a further radio transmission system, when a criterion requiring such action is satisfied.

10. A computer-based system for allocation of radio transmission systems for a transmission of data between transmitter/receiver stations, comprising:

an arrangement for selecting from at least two radio transmission systems;

an arrangement for receiving data from at least one mobile transmitter/receiver station, wherein the data is received via a subscriber profile; and an arrangement for switching over, as a function of a quantity of data to be transmitted, to a radio transmission system having a higher transfer rate if an expected cost and a speed of the mobile transmitter/receiver station permit;

wherein the computer-based system is an element of a switching device connected to a communication network.

* * * * *

UNITED STATES PATENT AND TRADEMARK OFFICE
CERTIFICATE OF CORRECTION

PATENT NO.     : 6,920,327 B1
DATED          : July 19, 2005
INVENTOR(S)    : Brandes et al.

It is certified that error appears in the above-identified patent and that said Letters Patent is hereby corrected as shown below:

Title page, Item [54] and Column 1, line 6,
Title, change "THE TRANSMISSION DATA" to -- THE TRANSMISSION OF DATA --.

Column 2,
Line 22, change "a customer is prepared for a transmission" to -- a customer is prepared to pay for a transmission --.

Signed and Sealed this

Fourteenth Day of February, 2006

JON W. DUDAS
*Director of the United States Patent and Trademark Office*